United States Patent
Dropps et al.

(10) Patent No.: US 9,282,046 B1
(45) Date of Patent: Mar. 8, 2016

(54) SMOOTHING FIFO AND METHODS THEREOF

(71) Applicant: QLOGIC, Corporation, Aliso Viejo, CA (US)

(72) Inventors: Frank R. Dropps, Maple Grove, MN (US); Ernest G. Kohlwey, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 105 days.

(21) Appl. No.: 13/830,717

(22) Filed: Mar. 14, 2013

Related U.S. Application Data

(60) Provisional application No. 61/727,009, filed on Nov. 15, 2012.

(51) Int. Cl.
*H04J 3/14* (2006.01)
*H04L 12/819* (2013.01)

(52) U.S. Cl.
CPC ..................... *H04L 47/21* (2013.01)

(58) Field of Classification Search
CPC ... H04L 47/125; H04L 47/12; H04L 47/2441; H04L 45/74; H04L 45/745; H04L 69/22; H04L 45/741; H04L 45/72; H04L 41/12; H04L 45/02; H04L 41/0806; H04W 28/08; H04W 28/0289; H04W 24/02; H04W 84/18
USPC .................. 370/235, 392, 250, 241
See application file for complete search history.

(56) References Cited

U.S. PATENT DOCUMENTS

| | | | |
|---|---|---|---|
| 2002/0006110 A1* | 1/2002 | Brezzo et al. | 370/229 |
| 2003/0103253 A1* | 6/2003 | Bunton | 359/123 |
| 2005/0018621 A1* | 1/2005 | Dropps et al. | 370/254 |
| 2005/0018650 A1* | 1/2005 | Dropps | G06F 13/385 370/351 |
| 2005/0063310 A1* | 3/2005 | Caldwell et al. | 370/241 |
| 2005/0111604 A1* | 5/2005 | Okuyama | 375/372 |
| 2007/0005248 A1* | 1/2007 | Averill et al. | 701/301 |
| 2007/0112992 A1* | 5/2007 | Schanke et al. | 710/307 |
| 2011/0096824 A1* | 4/2011 | Agazzi et al. | 375/233 |
| 2011/0182294 A1* | 7/2011 | Lee et al. | 370/394 |
| 2012/0106567 A1* | 5/2012 | Hanes et al. | 370/412 |

* cited by examiner

*Primary Examiner* — Andrew Chriss
*Assistant Examiner* — Atique Ahmed
(74) *Attorney, Agent, or Firm* — Klein, O'Neill & Singh, LLP

(57) ABSTRACT

Network device and associated methods are provided. The network device includes a plurality of base-ports, each base-port coupled to a plurality of network links and each base-port includes a plurality of sub-ports configured to operate as independent ports for sending and receiving information. Each network link is coupled to a smoothing first in-first out (FIFO) memory module that is used to temporarily store information at a first clock rate and information is read from the smoothing FIFO at a second clock. A sub-port can include one network link or more than one network link for receiving information from another device. A controller module monitors the smoothing FIFO for each network link to insert or delete characters from each of the smoothing FIFO based on a sub-port configuration for maintaining an order in which information is received for the sub-port.

21 Claims, 15 Drawing Sheets

FIG. 4D

SMF Deletes for Two Lanes

| Lane | First, Second & Third Delete State D5_33 | | | | Four Delete State D4_44 | Second & Third Delete State D8_32 | | | | | |
|---|---|---|---|---|---|---|---|---|---|---|---|
| smf_do½ 0 | [9] | [9] | D | D | D | D | [9] | [9] | 9 | [9] | [9] |
| smf_do½ 1 | [A] | [A] | E | E | E | E | [A] | [A] | [A] | [A] | [A] |
| smf_do½ 2 | [B] | [B] | F | F | F | F | [B] | [B] | [B] | [B] | [B] |
| smf_do½ 3 | [8] | 4 | C | 4 | C | 0 | 8 | 8 | 8 | 8 | [8] |
| | | | | | | | | | | | |
| smfmux_do 0 | [8] | C | C | C | D | [9] | C | [7] | [9] | [8] | 2 6 |
| smfmux_do 1 | 2 9 | [9] | D | D | 2 A | 2 A | D | 8 | [9] | [8] | 3 7 |
| smfmux_do 2 | 3 A | A | E | E | 3 A | B | E | A | A | A | 4 [A] |
| smfmux_do 3 | 4 B | B | F | F | 4 B | C | F | B | B | B | 5 B |
| | | | | | | | | | | | |
| smfmx_sel_sp 0 | 0 3 | 2 3 | 3 | 3 | 0 | 1 3 | 1 2 | 1 3 | 1 3 | 1 2 | 1 1 |
| smfmx_sel_sp 1 | 0 7 | 7 | 3 | 3 | 0 | 3 | 3 | 3 | 3 | 3 | 3 1 |
| smfmx_sel_sp 2 | 0 7 | 7 | 3 | 3 | 0 | 7 3 | 7 3 | 7 3 | 7 3 | 7 3 | 7 |
| smfmx_sel_sp 3 | 0 7 | 7 | 3 | 3 | 0 | 7 | 7 | 7 | 7 | 7 | 7 |
| | | | | | | | | | | | |
| smf_2read_sp 0 | 0 0 1 0 | 0 1 | 0 1 | 0 1 | 0 0 1 0 | 0 0 1 0 | 0 | 0 | 0 | 0 | 0 |
| smf_2read_sp 1 | 0 0 1 0 | 0 1 | 0 1 | 0 1 | 0 0 1 0 | 0 0 1 0 | 0 1 | 0 1 | 0 1 | 0 1 | 0 1 |
| smf_2read_sp 2 | 0 0 1 0 | 0 1 | 0 1 | 0 | 0 0 1 0 | 0 0 1 0 | 0 0 | 0 0 | 0 1 | 0 0 | 0 1 |
| smf_2read_sp 3 | 0 0 0 | 0 | 0 | 0 | 0 0 1 0 | 0 0 0 | 0 0 | 0 0 | 0 0 | 0 0 | 0 0 |

SMF Deletes for 4066E4

| | Lane | Fourth Delete State D9_41 | | | |
|---|---|---|---|---|---|
| smf_do½ | 0 | 5 9 D | ▨ | 9 | 9 |
| smf_do½ | 1 | 6 A E | A | ▨ | A |
| smf_do½ | 2 | 7 B F | B | B | ▨ |
| smf_do½ | 3 | 4 ⊠ 0 | ⊠ | ⊠ | ⊠ |
| smfmux_do | 0 | 4 9̄ D | 8 | 8 | 8 |
| smfmux_do | 1 | 5 A E | Ā | 9 | 9 |
| smfmux_do | 2 | 6 B F | B | B̄ | A |
| smfmux_do | 3 | 7 C 0 | C | C | C̄ |
| smfmx_sel_sp | 0 | 3 0 0 | 3 3 0 | 3 3 0 | 3 3 0 |
| smfmx_sel_sp | 1 | 3 0 0 | 3 0 0 | 3 3 0 | 3 3 0 |
| smfmx_sel_sp | 2 | 3 0 0 | 3 0 0 | 3 0 0 | 3 3 0 |
| smfmx_sel_sp | 3 | 3 4 0 | 3 4 0 | 3 4 0 | 3 4 0 |
| smf_2read_sp | 0 | 0 0 0 | 0 | 0 | 0 |
| smf_2read_sp | 1 | 0 0 0 | 0 | 0 | 0 |
| smf_2read_sp | 2 | 0 0 0 | 0 | 0 | 0 |
| smf_2read_sp | 3 | 0 01 0 | 01 | 01 | 01 |

FIG. 4H

SMOOTHING FIFO AND METHODS THEREOF

CROSS-REFERENCE TO RELATED APPLICATIONS

This patent application claims the benefit under 35 U.S.C. §119(e) of U.S. Provisional Patent Application, Ser. No. 61/727,009 filed on Nov. 15, 2012, the disclosure of the aforementioned provisional application is incorporated herein in its entirety.

BACKGROUND

1. Technical Field

The present disclosure relates to networks and more particularly, to network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols in network devices.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a network device is provided. The network device includes a plurality of base-ports, each base-port coupled to a plurality of network links and each base-port includes a plurality of sub-ports configured to operate as independent ports for sending and receiving information. Each network link is coupled to a smoothing first in-first out (FIFO) memory module that is used to temporarily store information at a first clock rate and information is read from the smoothing FIFO at a second clock. A sub-port can include one network link or more than one network link for receiving information from another device. A controller module monitors the smoothing FIFO for each network link to insert or delete characters from each of the smoothing FIFO based on a sub-port configuration for maintaining an order in which information is received for the sub-port.

In another embodiment, a network device is provided. The network device includes a plurality of base-ports, each base-port coupled to a plurality of lanes and each base-port includes a plurality of sub-ports configured to operate as independent ports for sending and receiving information. Each lane is coupled to a smoothing first in-first out (FIFO) memory module in a physical coding layer (PCS) for temporarily storing information at a first clock rate and reading out information from the smoothing FIFO at a second clock. A controller module monitors the smoothing FIFO for each lane to insert or delete characters from each of the smoothing FIFO based on a sub-port configuration. To maintain an order in which information is received at a multi-lane sub-port having more than one lane, characters are inserted at smoothing FIFO for each lane in one clock cycle or more than one clock cycle depending on a number of characters and which among the multi lanes is where a first character is inserted. Depending on a number of deletable characters, lanes are rotated for deleting entries from each smoothing FIFO of the multi-lane sub-port for maintaining the order.

In yet another embodiment, a network device is provided. The network device includes a plurality of base-ports, each base-port coupled to a plurality of lanes and each base-port includes a plurality of sub-ports configured to operate as independent ports for sending and receiving information. Each lane is coupled to a smoothing first in-first out (FIFO) memory module in a physical coding layer (PCS) for temporarily storing information at a first clock rate and reading out information from the smoothing FIFO by a media access control layer (MAC) at the second clock rate by rotating lanes in different clock cycles for maintaining an order in which information is received for a sub-port configured to operate as a multi-lane port. A controller module monitors the smoothing FIFO for each lane of the multi-lane sub-port to insert or delete characters from each of the smoothing FIFO. At any given instance when a number of deleteable characters equals a number of lanes, then the deletable characters are all deleted within a same clock cycle without any lane rotation.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the accompanying drawings of various embodiments. The illustrated embodiments are intended to illustrate, but not to limit the invention. These drawings include the following figures, in which like numerals indicate like parts:

FIG. 4D-4H show examples of deleting words at the smoothing module for the different states of FIG. 4C;

DETAILED DESCRIPTION

Figure 1:
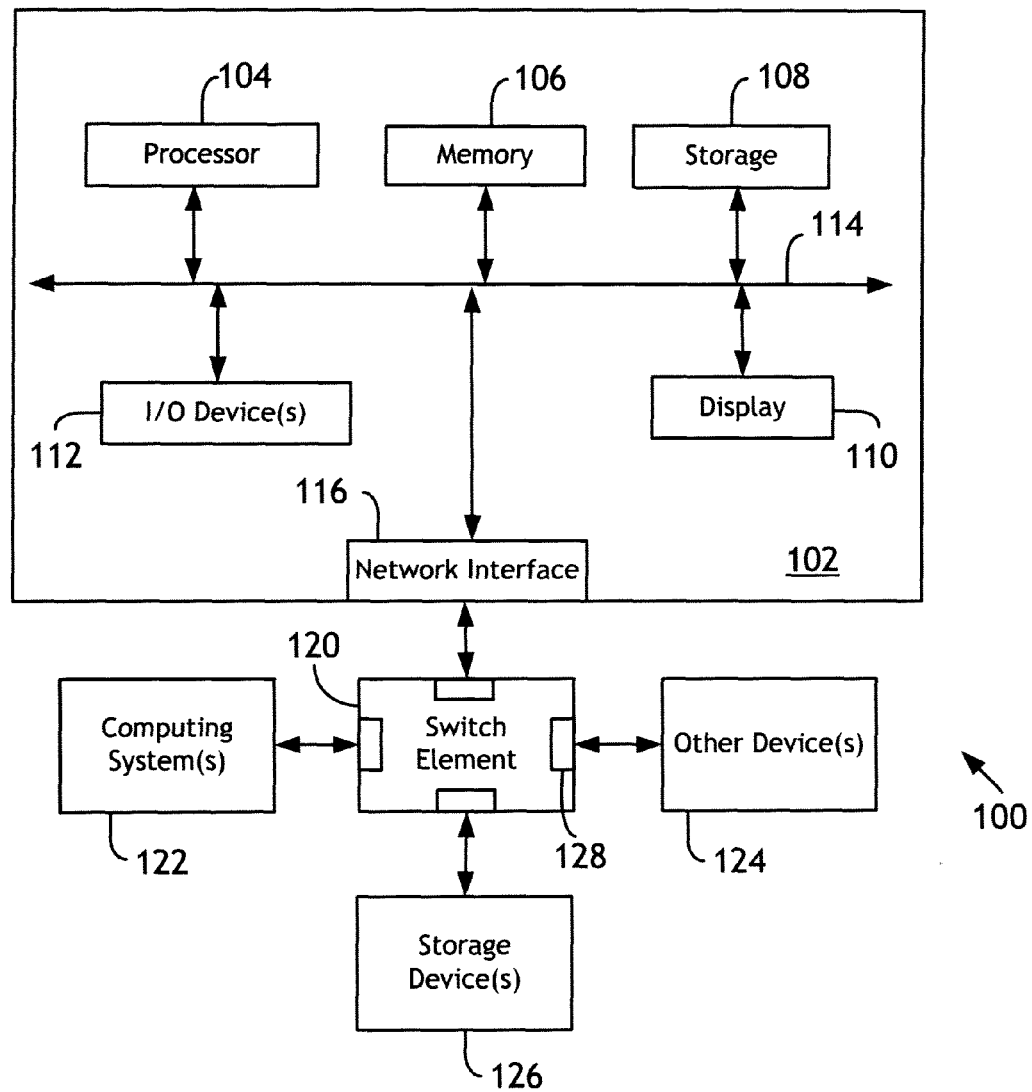
FIG. 1 is a functional block diagram of a network in connection with which the present embodiments may be used.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a server layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 for the host system 102 and an interface (not shown) for the storage devices 126. Fabric ports are typically located in Fabric devices, such as the switch element 120. Details regarding the switch 120 are provided below.

Figure 2A:
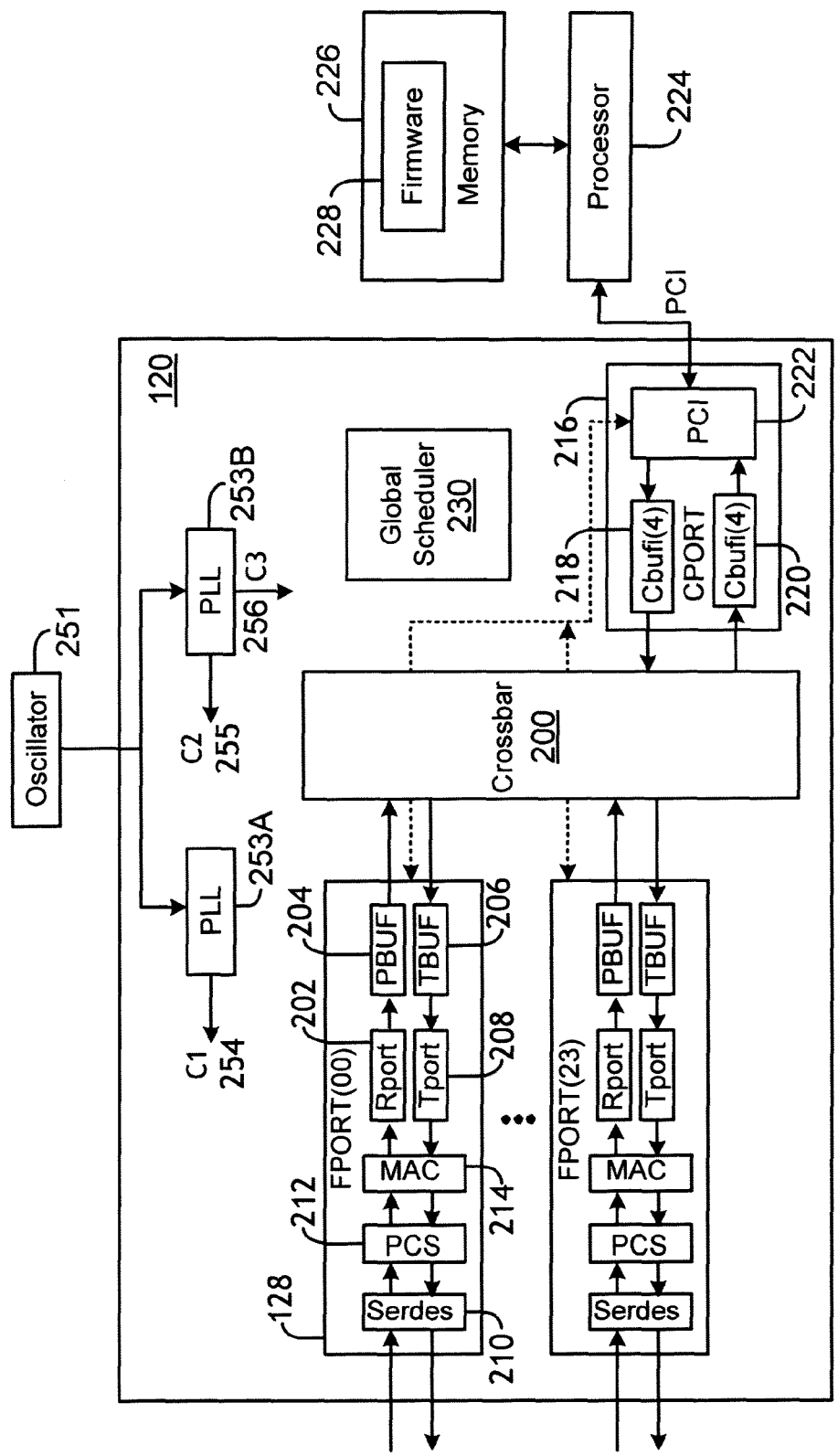
FIG. 2A is a functional block diagram of a switch element according to the present embodiments.

FIG. 2A is a high-level block diagram of the switch 120, also referred to as the switch element 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, Clock1 254, Clock2 255, and Clock3 256 that are described below in detail. As an example, Clock1 254 may be 425 MHz when a port is configured to operate as a Fibre Channel port, Clock2 255 may be 312 Mhz when a port is configured to operate as an Ethernet port, and Clock3 256 may be a system clock of 850 MHz. The embodiments disclosed herein are not limited to any particular clock rate.

The ports 128 are generic (GL) ports and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared switch crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate ports 128 and a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200 and a transmit buffer (TBUF) 206. The TBUF 206 is a temporary memory storage device where frames or information related to frames are staged before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 uses CPORT 216 to communicate with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to vector frames from the PBUFs 204, the TBUFs 206, and CBUFI 218 to the processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port and one single lane Ethernet port and one single lane Fibre Channel port, one double lane Ethernet port and two single lane Fibre Channel port, one four lane Ethernet port, or one four lane Fibre Channel port. Port 128 uses some logic that is shared among the multiple sub-ports and some logic that is dedicated to each sub-port.

Figure 2B:
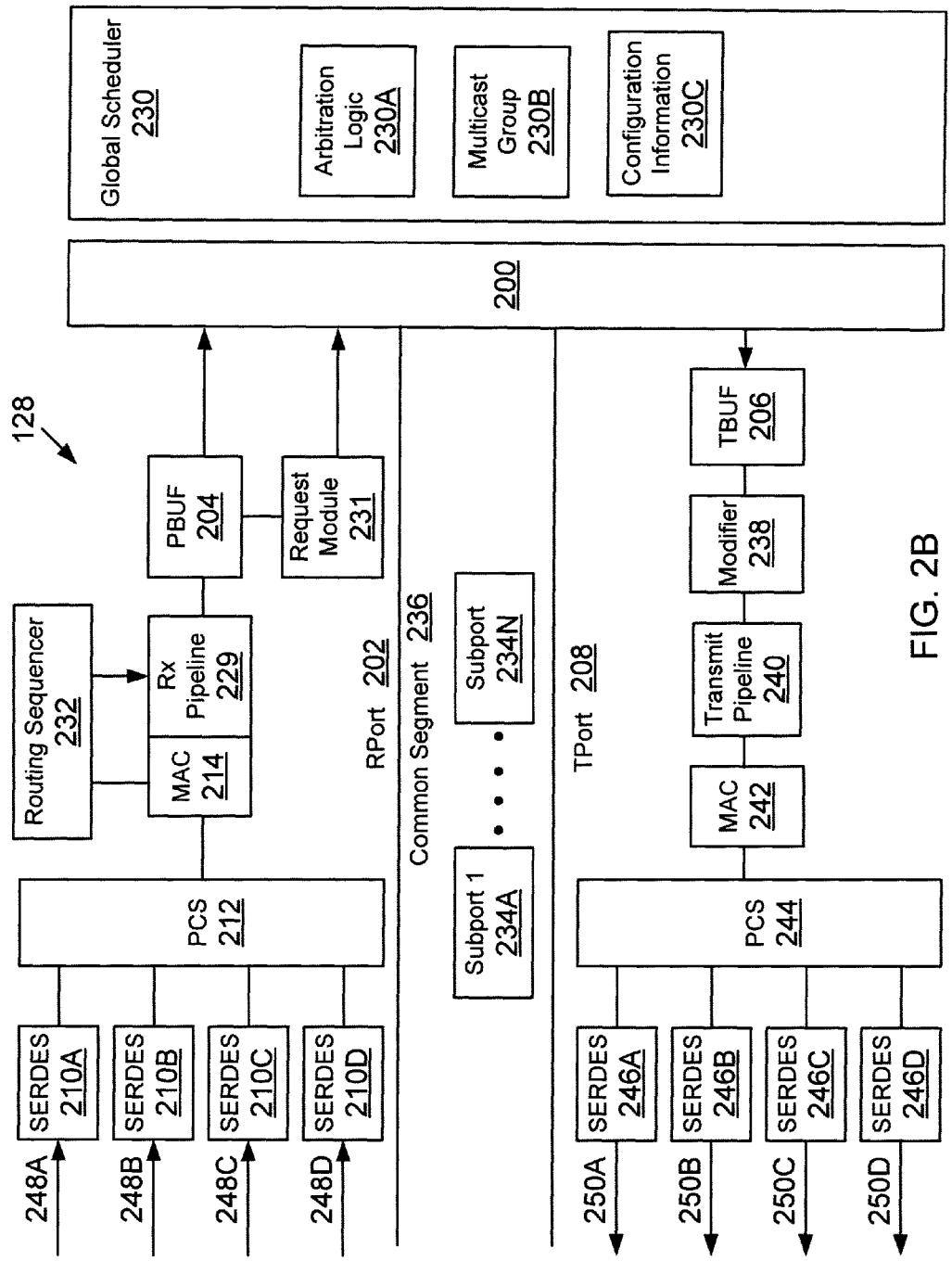
FIG. 2B is a block diagram of a port, according to one embodiment.

FIG. 2B shows an example of base-port 128 having RPORT 202, TPORT 208, and a common segment 236, according to one embodiment. RPORT 202 is used for receiving and processing frames, while TPORT 208 is used for transmitting frames. Common segment 236 is used to store configuration and status information that may be commonly used among different components of base-port 128. In one embodiment, base-port 128 may be configured to include a plurality of sub-ports. The configuration, status, and statistics information/logic 234A-234N for each sub-port may be stored in common segment 236. The configuration logic 234A-234N may include look up tables or other data structures for storing configuration information.

RPORT 202 may include or be coupled to a plurality of network links (or lanes), for example, four independent physical network links 248A-248D, each configured to operate as a portion of an independent sub-port within base-port 128. Each network link is coupled to a SERDES 210A-210D, all of which share PCS 212 and MAC 214. The multiple lanes also share a receive pipeline (Rx pipeline) 229 that is used for pre-processing received frames before they are transferred. Both MAC 214 and receive pipelines 229 are time multiplexed so that they can be shared among the plurality of links based on how the ports are configured to operate. It is noteworthy that, in one embodiment, the receive pipeline 229 may include PCS 212 and MAC 214.

Incoming frames are received via one of the network links 248A-248D. A received frame is processed by the appropriate SERDES 210A-210D and then sent to the PCS 212. After PCS 212 processes part of the frame, part of the frame is provided to MAC 212 that is time-shared among a plurality of sub-ports. Thus, for a certain time segment (for example, a clock cycle), MAC 214 may be used by one of the sub-ports. After the MAC module 214 processes part of the frame, part of the frame is sent to receive pipeline 229 that is also time-shared. This process continues until each block has processed the complete frame.

Information regarding the frame or a copy of the frame is also provided to a routing sequencer 232 that determines a destination for the received frame. In one embodiment, a frame whose destination is processor 224 is given the highest priority, followed by a frame that is routed by a TCAM (ternary content addressable memory) or steering registers located within the routing sequencer 232. It is noteworthy that more than one routing sequencer 232 may be used for each base-port 128. Frames that are ready to be sent out are then staged at PBUF 204. PBUF 204 may have a plurality of queues (or slots) that may be referred to as receive queues (or receive buffers). The receive queues temporarily store frames, until a request to move the frame is granted.

To move frames from the receive queues, a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base-ports. Scheduler 230 also maintains a data structure at a memory labeled as multicast group 230B. The data structure stores information for identifying multicast groups that may receive multicast frames, e.g., frames that are destined to multiple destinations. Scheduler 230 stores configuration information 230C for various ports and some of that information may be used to select requests.

Frames for transmission via TPORT 208 move via TBUF 206 and a modifier 238. In one embodiment, modifier 238 may be used to insert, modify, or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. Links 250A-250D may be a part of 248A-248B links for sending and receiving information. It is noteworthy that although separate PCS and MAC have been shown for RPORT 202 and TPORT 208, some of the same PCS and MAC logic may be shared and used in the receive and transmit paths, as seen in FIG. 2A.

Figure 3A:
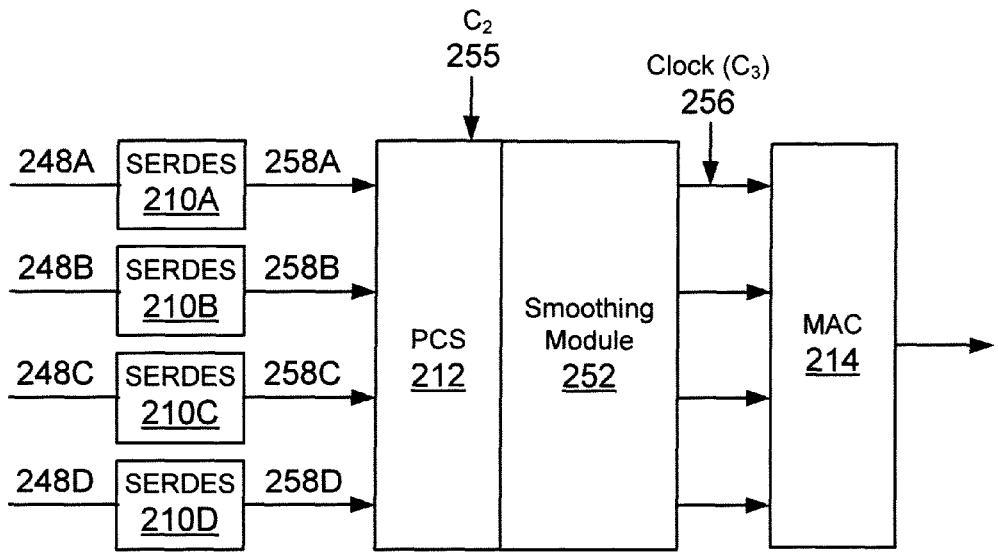
FIG. 3A is a block diagram illustrating an example of frames being received.

FIG. 3A illustrates an example of receiving frames 258A-258D at PCS 212 from SERDES 210A-210D. The frames may be received at different clock rates based on the configuration of network links 248A-248D and the associated sub-ports. As an example, frames (or data) may be received at PCS 212 and stored at Clock1 254 and/or Clock2 255 at a smoothing module 252, and then read out of PCS 212 at clock Clock3 256. PCS 212 includes the smoothing module 252 having a memory storage device with a plurality of storage locations, described below in detail. The storage locations are used to stage frames or portions of a frame before the frames are read out at Clock3 256 from a rate matching FIFO (not shown).

Figure 3B:
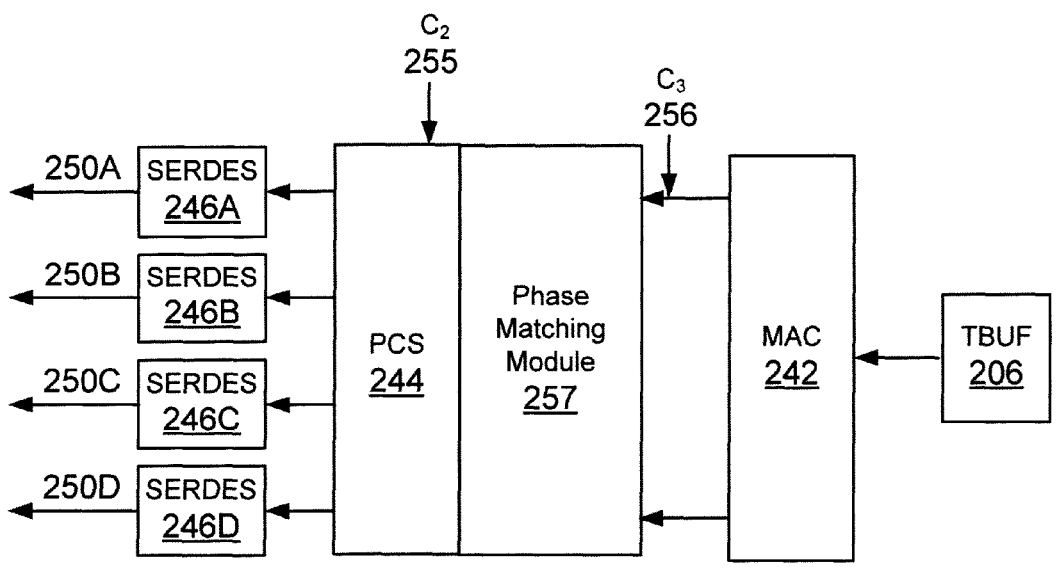
FIG. 3B is a block diagram illustrating an example of frames being transmitted.

In the transmit path, as shown in FIG. 3B, frames are received at a phase matching module 257 via TBUF 206 and shared MAC 214. In the transmit path, frames are written to the phase matching module 257 using the system clock 256 and read out at a clock rate Clock 2 255 to match the sub-port link rate. A read control logic (not shown) is used to read data from TBUF 206 to avoid any errors due to a mismatch between the system clock and the clock at which data is read out for transmission from PCS 244. It is noteworthy that PCS 212 may be used in the transmit path and the receive path i.e. to receive data and send data.

As mentioned above, base-port may have multiple sub-ports that may operate using different protocols and transfer rates. A port may be configured to use 1 to 4 lanes. Frames may be written at different clock rate and read out at different clock rate, for example, at a system clock rate (256). It is desirable to have the same circuits perform clock rate difference matching in both single and multilane configurations.

Figure 4A:
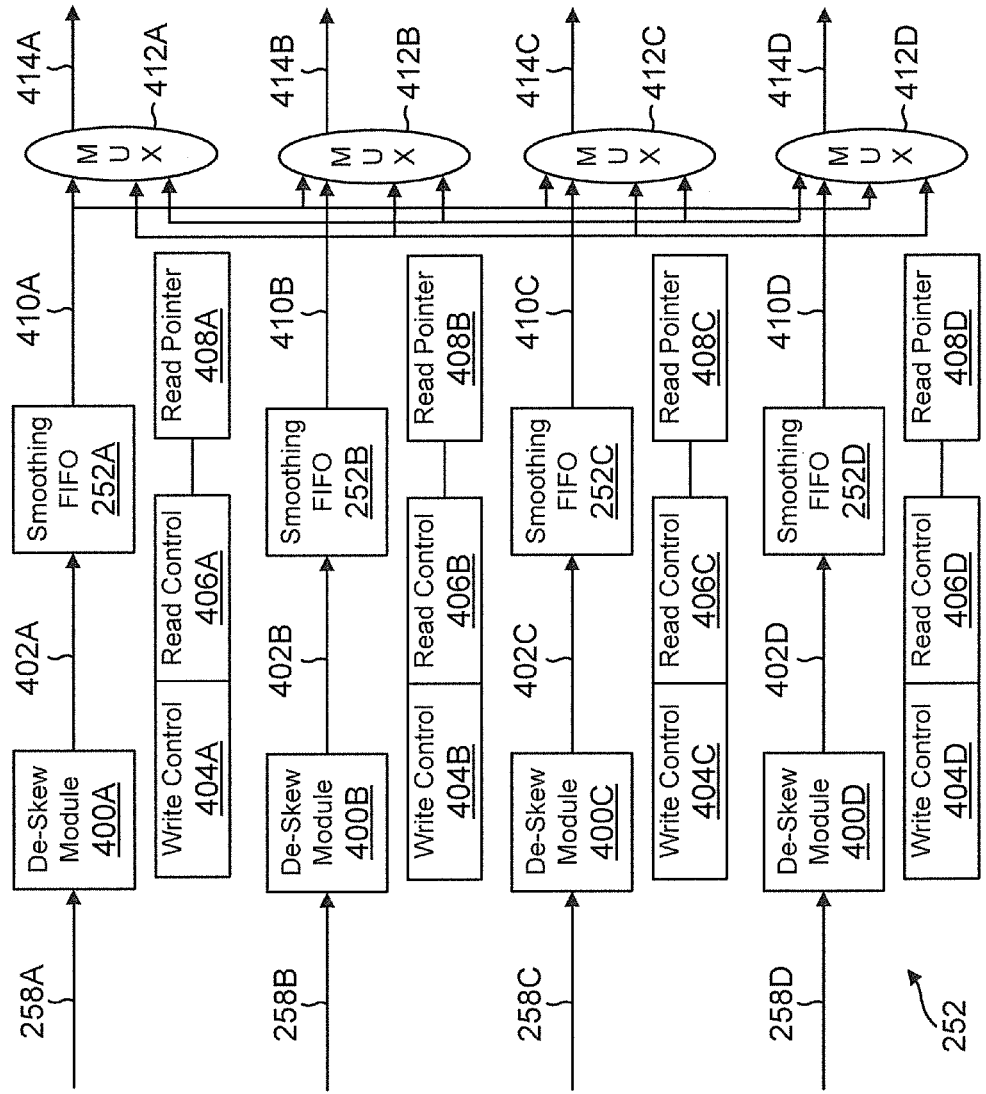
FIG. 4A shows a block diagram with components of a smoothing module of PCS 212 of FIG. 3A, according to one embodiment.

FIG. 4A shows a block diagram of a smoothing module 252, according to one embodiment. Smoothing module 252 may include or have access to de-skew modules 400A-400D. Each de-skew module is associated with a sub-port or lane. For example, de-skew module 400A is for sub-port 0 using network link 248A and receives data 258A, de-skew module 400B is for sub-port 1 using network link 248B and receives data 258B, de-skew module 400C is for sub-port 2 using network link 248C and receives data 258C and de-skew module 400D is for sub-port 3 using network link 248D to receive data 258D. The term data may also be referred to as "words" or entries.

De-skew modules 400A-400D align incoming data 258A-2258D, respectively, for each lane. The data is then provided to smoothing FIFOs (first in-first out storage) 252A-252D, respectively. The data is written at C1 254 or C2 255 depending on the sub-port protocol configuration. The data is written by write control modules 404A-404D. Data from the smoothing FIFOs 252A-252D are read by a read control module 406A-406D that each maintain pointers 408A-408D that provide the location where data is written. In one embodiment, each smoothing FIFO 252A-252D includes a plurality of locations or slots that are uniquely identified. The read pointers 408A-408D point to the location where data is located. It is noteworthy that although separate write and read control modules are shown for each smoothing FIFO, the adaptive embodiments may use a centralized write and read control modules.

Data 410A-410D from smoothing FIFOs (SMF) 252A-252D is sent to a multiplexer 412A-412D, respectively. Data 414A-414D (which is the same as data 410A-410D) is sent for processing to a next stage to a rate matching FIFO (not shown).

Figure 4B:
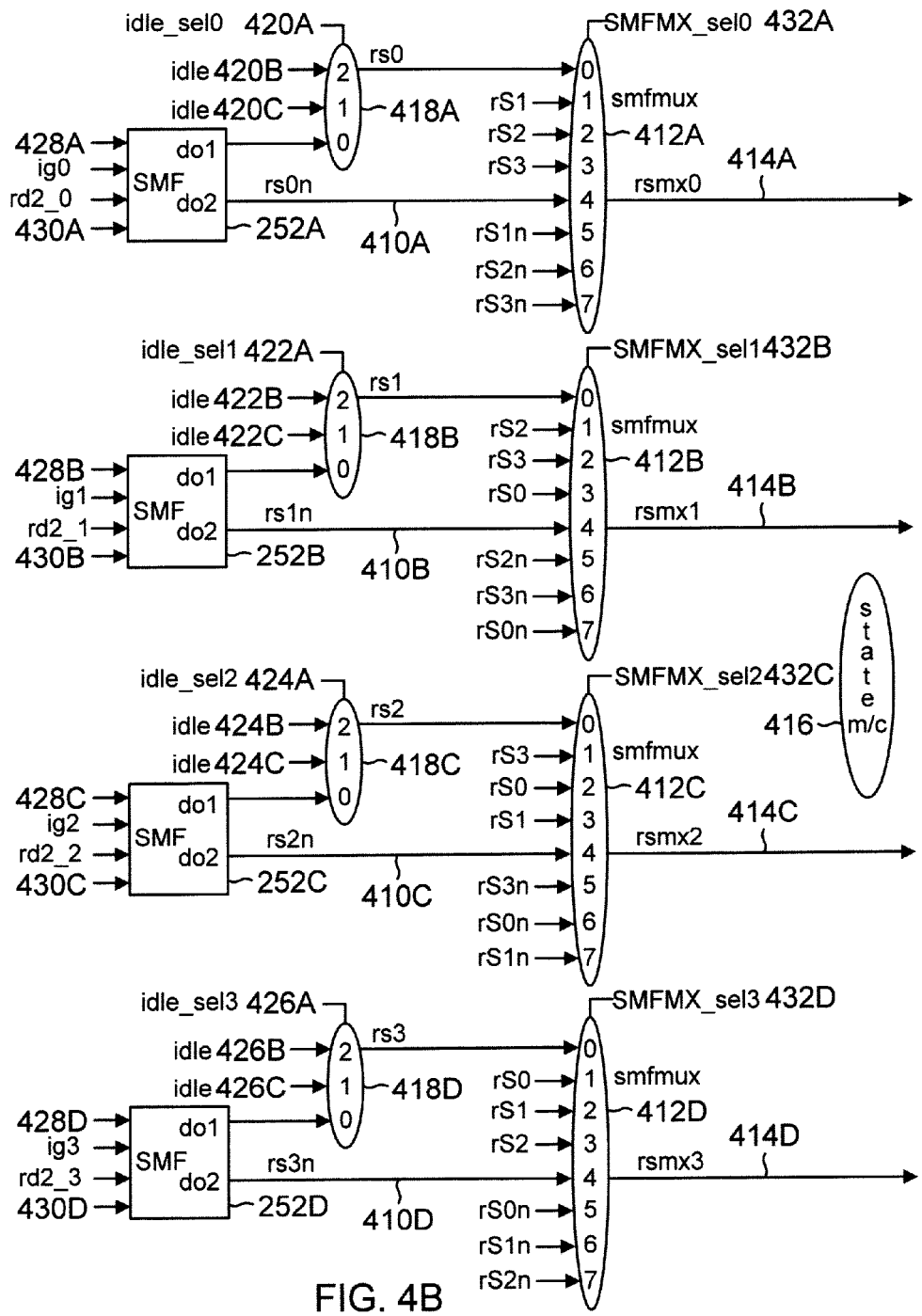
FIG. 4B shows a detailed block diagram of a smoothing module of PCS 212 of FIG. 3A, according to one embodiment.

FIG. 4B shows a detailed block diagram of smoothing module 252 having a state machine 416. State machine 416 is used for managing insert and delete operations as described below in detail.

SMF 252A-252D are provided with signals ig0-ig3 428A-428D and rd2-0 to rd2-3 430A-430B, respectively. The ig0 428A is provided to insert idle primitives. "ig" stands for insert grant and the "0" denotes sub-port 0, "1" denotes sub-port 1 and so forth. A current word that is read is shown as "do1" for each SMF, while a "next" word read is shown as "do2".

When a signal 428A is asserted for a SMF, then an idle-sel signal is asserted. For example, for SMF 252A, the idle select signal is 420A. If more than one idle is inserted then signal 420B is asserted and if 1 Idle is inserted then signal 420C is asserted at Mux 418A. Mux 418A is used to insert either one or two Idles. Signals 422A-422C, 424A-424C and 426A-426C are similar to 420A-420C. Muxes 418B-418C are similar to Mux 418A.

"rd2" is a signal that initiates a "double word" read for a sub-port. The "0" in rd2-0 indicates a double read for sub-port 0, while the 1, 2 and 3 in rd2-1, rd02-2 and rd2-3 for reading a double word for sub-port 1, 2 and 3.

Mux 412A is selected by the SMF Mx-Sel 0 432A signal that is asserted by state machine 416. Information from SMF 252A (shown as 414A) is then moved to a rate matching FIFO for further processing. Signal 432B is used to select Mux 412B, signal 432C is used to select Mux 412C and signal 432D is used to select Mux 412D.

When multiple lanes (or links) are used for receiving and transmitting data, for example, two lanes in 20G Ethernet or 4 lanes in 40G Ethernet port configuration, there may be clock rate miss-match between the clock rate at which data is received (C1 254/C2 255) and read (system clock C3 256). In one embodiment, as described above, each lane has a SMF. A controller (for example, state machine 416. FIG. 4B) keeps the write addresses the same for each lane SMF. However, when a delete operation or an insert operation is performed, the lanes are rotated to maintain the order in which data was received. The manner in which lanes are rotated depends on the insert and delete operations.

Any lane may request a delete operation or an insert operation at any time. The delete operation is performed to delete any deletable characters from the data that is received to avoid any overrun conditions. Idle primitives are inserted to avoid under run conditions.

In one embodiment, delete requests begin from lane 0 and then progress sequentially. A double read operation is started from a lane that is being read at a given clock cycle. The lane that has a deletable entry is ignored such that the deletable entry is discarded. The delete process with examples is provided below in detail.

If an insert operation is requested by a particular lane and it is granted, then output of each SMF is rotated by the output Mux 418A-418D so that data is maintained in order. This is shown in FIG. 4B where, for example, when an insert operation is granted for lane 0, then the d02 output i.e. the next read for the other lanes is rotated to maintain the order of data reads. The insert process is also described below in detail.

Figure 4C:
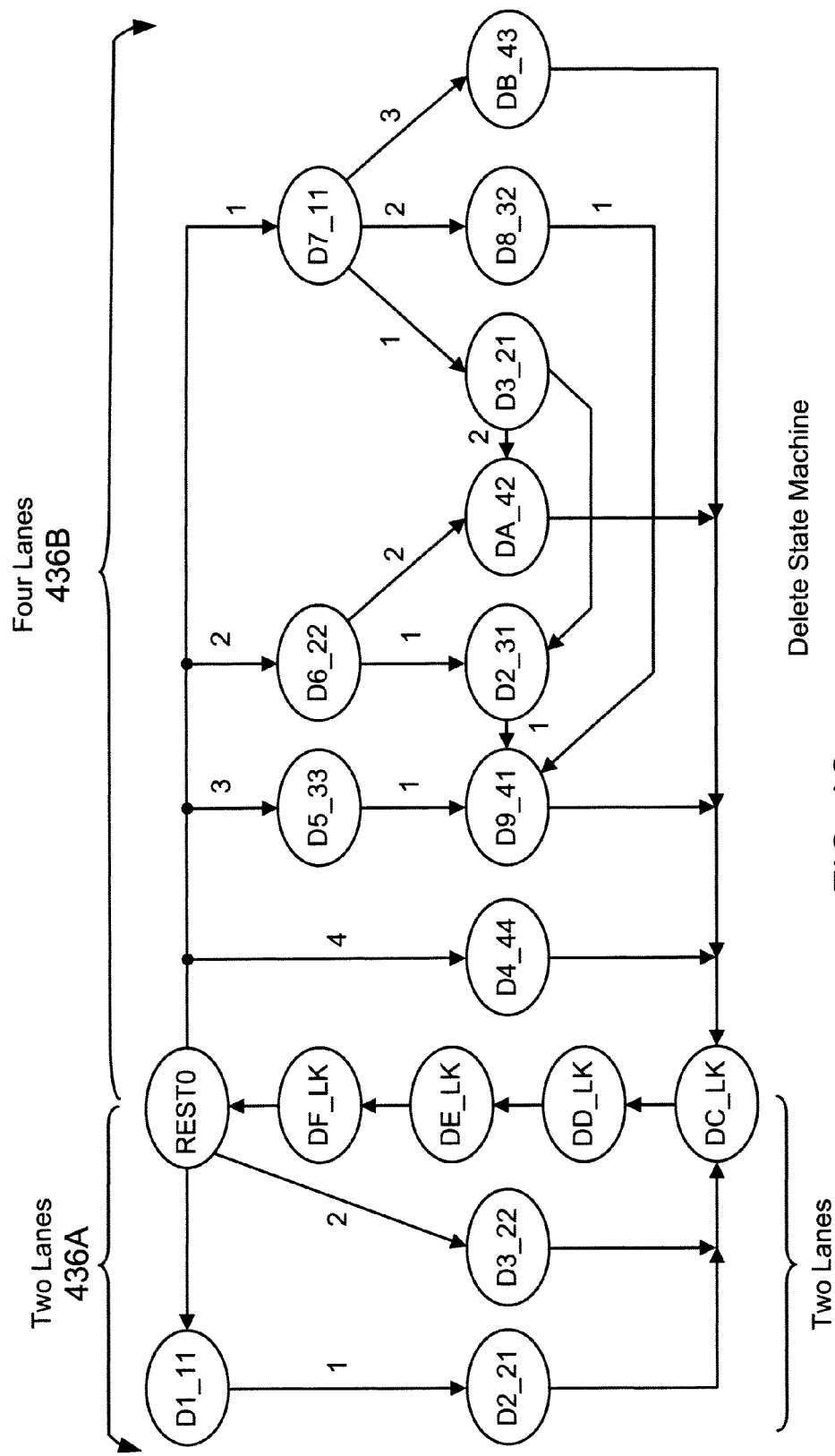
FIG. 4C show state machine diagrams for the system of FIGS. 4A-4B to delete words, according to one embodiment.

FIG. 4C shows a state machine diagram for deleting entries at SMF 252A-252D, according to one embodiment. Segment 436A is for a two lane port for example, a 10G Fibre Channel port, 20G Fibre Channel port, 40G Fibre Channel port or a 20G Ethernet port having lanes 0 and 1. Segment 436B shows deletion for a four lane (lane 0, 1, 2 and 3) port, for example, a port configured to operate as a 40G Ethernet port.

Rest 0 is a rest state, while DF_LK, DE-LK, DD_LK and DC-LK are lock states when no deletions take place. In the two lane configuration, in a first clock cycle, when a request is received from one lane that has a deletable character, then one deletable character (or word) is deleted in state D1-11. The first "1" in "11" indicates that a total of 1 word is deleted from a lane and there is 1 deletable character in the first clock cycle. If there is another deletable character, then it is deleted in the next clock cycle in state D2-21. The 2 in "21" indicates that a total of two deletable characters have been deleted in D1-11 and D2-21 and that there was 1 deleteable character after state D1-11. It is noteworthy that the same convention is used for all the states in the state machine diagram, i.e. the first digit shows the cumulative deletion and the second digit shows what is deleted in a current state.

State D3-22 shows that there are two deletable characters, one in each lane, in a clock cycle and they are deleted within the same clock cycle. The state machine 416 goes to state DC_LK after D3-22 and D2-22.

For segment 436B, if there are 4 deletable words at any given instance (or clock cycle), one in each lane, then no rotation is needed and in state D4-44, deletable word for each lane is deleted. The state machine then transitions to DC_LK.

When there are 3 deletable words, one in each lane, then in state D5-33, the three deletable words are deleted within the same clock cycle. In another clock cycle, in state D9-41, another deletable word is deleted increasing the cumulative number to 4.

In state D6-22, two deletable words, one from each lane, are deleted and then the process moves to state DA-42 or D2-31. In DA-42, two words are deleted bringing the cumulative score to 4. While in D2-31, one word is deleted, bringing the score to 3 and then moving to D9-41 that has been described above.

If there is 1 deletable entry, then in state D7-11, it is deleted. From there the state machine may go to DB-43, D8-32 and D3-21. In DB-43, three words are deleted bring the cumulative score to 4. In D8-32, two words are deleted bringing the cumulative score to 3 and the process moves to state D9-41. In D3-21, one word is deleted bringing the cumulative score to 2 and the next state is DA-42 that has been described above.

Figure 4D:
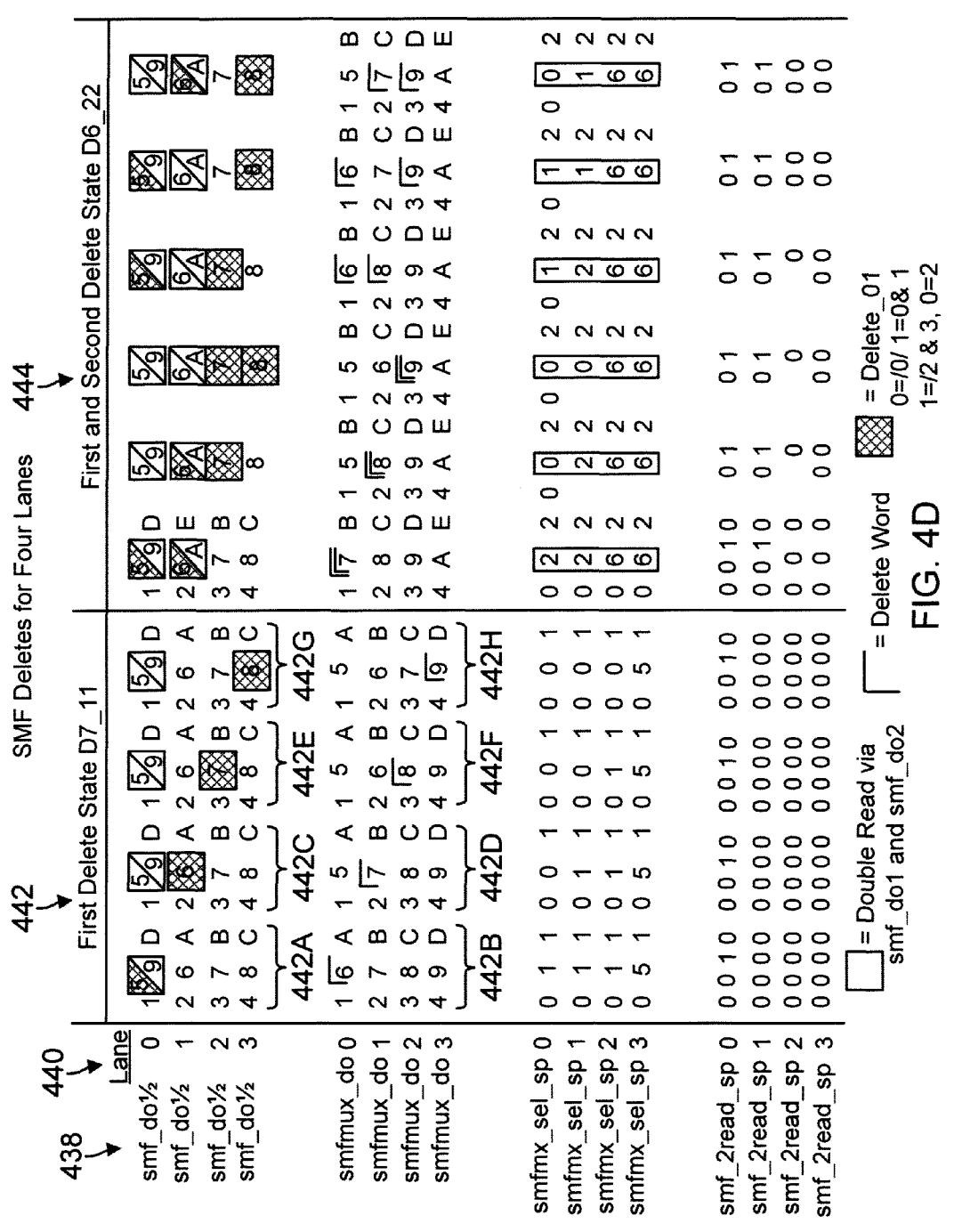

FIG. 4D shows an example of state D7-11 in segment 442. Segment 444 shows an example of state D6-22. Column 438 shows a plurality of signals smf_do1 (a current word) and smf-do2 (a next word), SMFMux_d0 shows the lane rotations. SMFMX_Sel is to select one of Mux 412A-412D output. SMF_2 read shows when a double read is performed. Segment 440 shows the sub-port or lane numbers 0, 1, 2 and 3. A rectangle shows a double read from a lane, the shaded entry is a deletable entry and a bar on top of an entry indicates a deleted entry.

In segment 442, various examples are shown for performing a double read operation and delete operation. For example, in 442A, lane 0 has word 1, lane 1 has word 2, lane 2 has word 3 and lane 3 has word 4. Lane 0 also has word 5, lane 1 has word 6, lane 2 has word 7 and lane 3 has word 8. Lane 0 then has word 9, lane 1 has word A, lane 2 has word B, lane 2 has word C and lane 0 has word D. 442A shows that word 5 is a deletable entry at any given instance and how it is handled. For example, in a first clock cycle, word 1 is read from lane 0, word 2 is read from lane 1, word 3 is read from lane 3 and word 4 is read from lane 4. The deletable entry is word 5 in lane 0.

In a next clock cycle, word 5 is deleted, which is shown by the bar above the word 6 in segment 442B, below 442A. Word 9 is read instead of word 5 that is deleted and then word 6, 7 and 8 are read within the same clock cycle. In a next clock cycle, words D, A, B and C are read.

Segment 442B shows the lane rotations for segment 442A clock cycles. In the first cycle words 1, 2, 3 and 4 are read and no rotation is needed. When word 5 is deleted in the second clock cycle, the lanes for 6, 7, 8 and 9 are rotated. In the third clock cycle lanes for words A, B, C and D are rotated. Hence by rotating the lanes, the order of the words on the four lanes can be maintained.

Segment 442C shows do1 and do2 when lane 1, entry 6 is deletable. The lane rotations are shown in segment 442D below and are self-explanatory. Segment 442E shows the deletable entry is 7 in lane 2. The lane rotations are shown in segment 442F. Segment 442G shows an example where the deletable entry is word 8 at lane 3. Segment 442H shows the lane rotations in 3 clock cycles.

Thus, regardless of which lane has a deletable entry, the lanes are rotated to maintain the order in which words are processed.

Segment 444 shows an example of first and second deletes for state D6-22. The examples shown in segment 444 show how lane rotations are performed for D6-22.

Figure 4F:
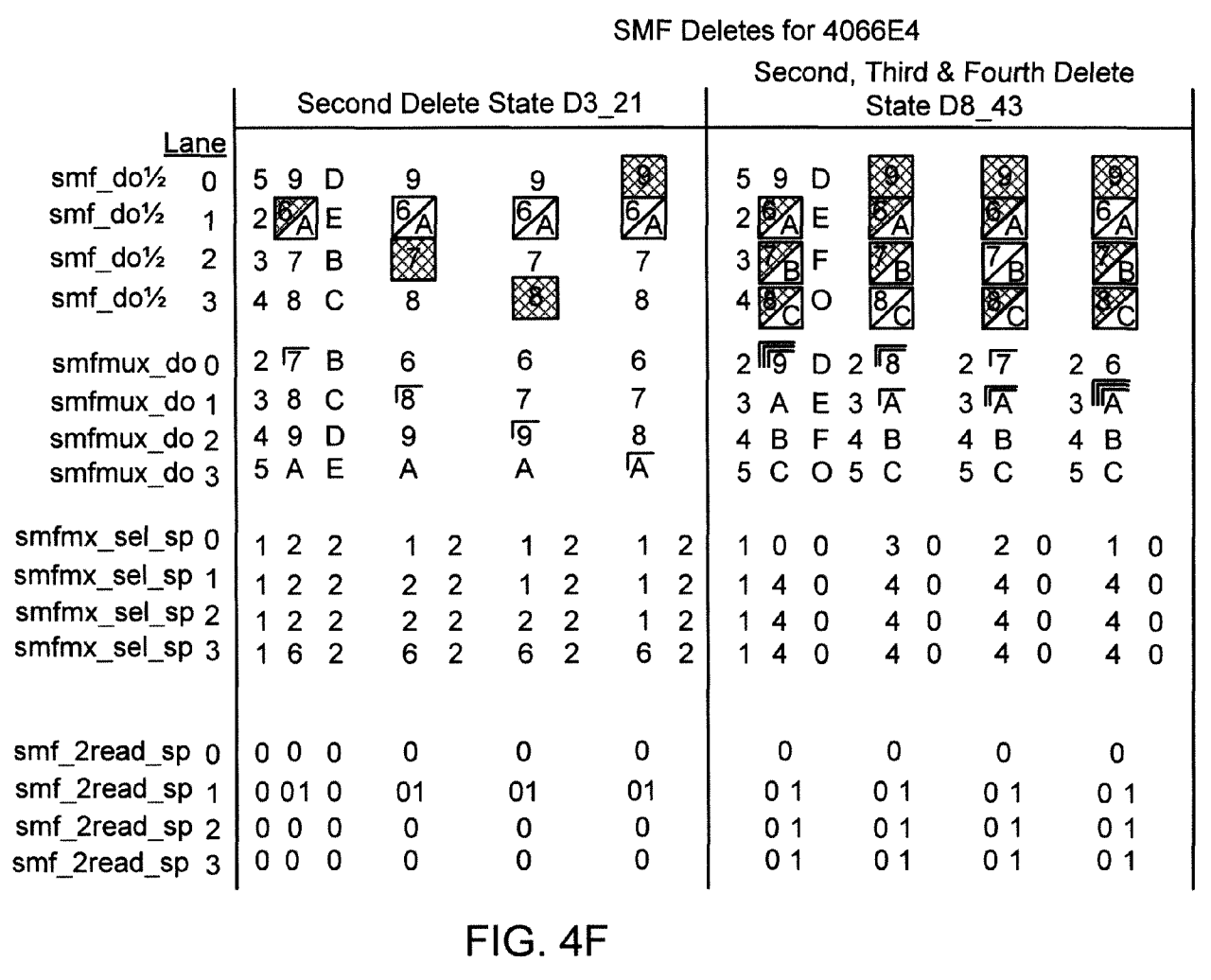
Figure 4G:
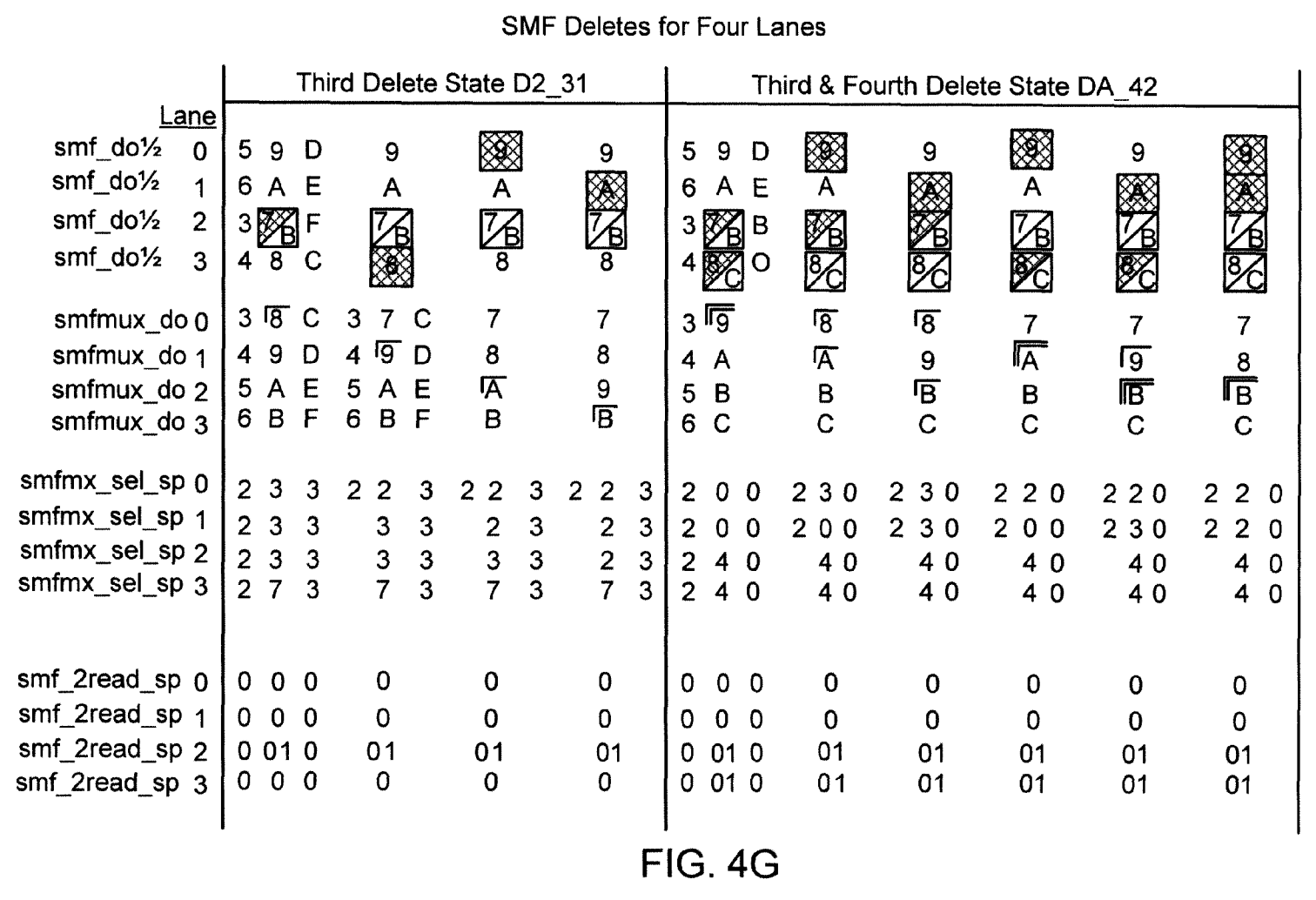

FIG. 4E show lane rotations for state D5-33 and D8-32. FIG. 4F show lane rotations for state D3-21 and DB-43. FIG. 4G shows lane rotations for state D2-31 and DA-42. FIG. 4H shows lane rotations for state D9-41.

Figure 4I:
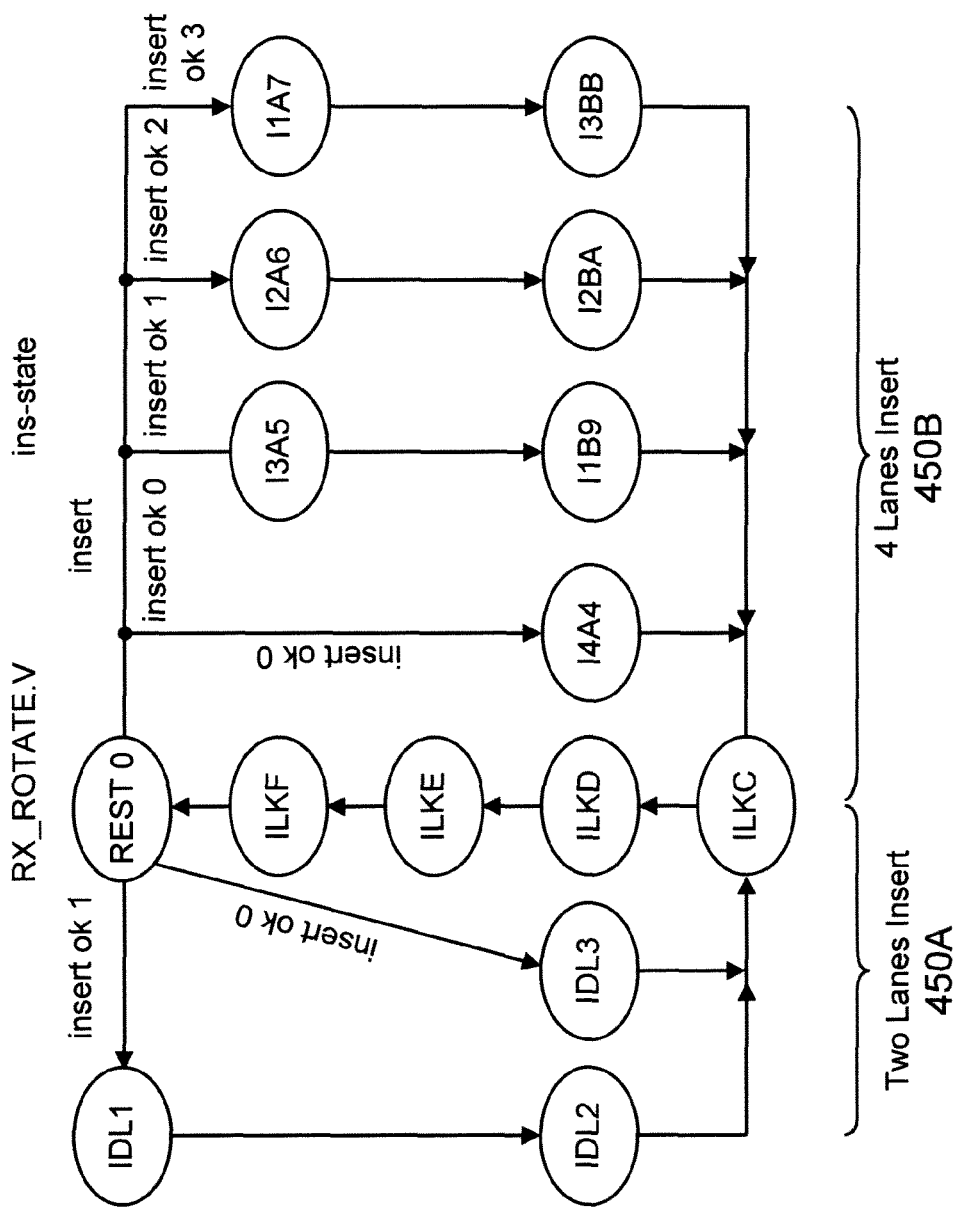
FIG. 4I shows a state machine diagram for inserting primitives at the smoothing module, according to one embodiment.

FIG. 4I shows a state machine diagram for state machine 416 for inserting idles while maintaining data order, according to one embodiment. The rest state is shown as rest 0, while the lock states are shown as ILKF, ILKE, ILKD and ILKC. Segment 450A shows for two lanes (for example, (lane 0 and 1) 10G Fibre Channel, 20G Fibre Channel, 40G Fibre Channel and 20G Ethernet. Segment 450B is for a 4-lane configuration (lane 0, 1, 2 and 3), for example, 40G Ethernet.

State IDL1 is based on when an insert is acceptable in lane 1 in a first clock cycle. In the next clock cycle, in state IDL2, insert is performed in lane 0. If insert in lane 0 is acceptable, then an insert operation can be performed on both lanes on state IDL3.

State I4A4 is used when an insert operation can begin in lane 0. In this state, in a same clock cycle, four inserts can be performed, one in each lane.

In state I3A5, insert begins in lane 1 in the first clock cycle along with inserts in lane 2 and lane 3 and lane 0 insert operation is performed in state I1B9 in the next clock cycle.

In state I2A6, insert starts in lane 2 along with an insert in lane 3 and in state I2BA, insert can be performed in lanes 0 and 1. In state I1A7, insert starts in lane 3 in a first clock cycle and the in the next clock cycle, insert can be performed in lane 0, 1 and 2.

Figure 4J:
FIG. 4J shows an example of inserting primitives based on the states of FIG. 4I.

FIG. 4J shows an example of inserting for a two lane port configuration, according to one example. The circles entries indicate which lane the inserts are acceptable, while the rectangle is used to indicate when the read address is not incremented. The inserted entries are shown as I1 and I2.

Figure 5:
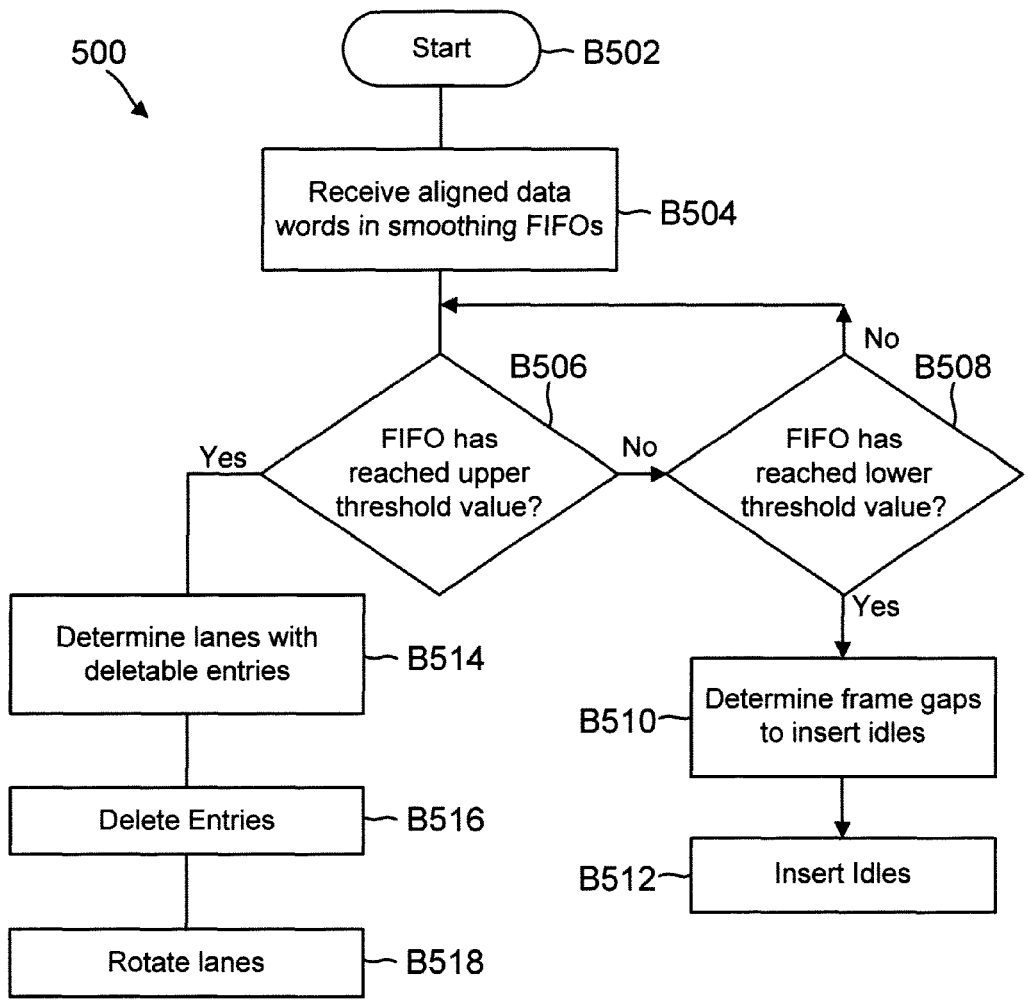
FIG. 5 is an overall process flow diagram, according to an embodiment.

FIG. 5 shows a process 500 for managing inserts and deletes for switch element 120, according to one embodiment. The process begins in block B502, when words are received in a multi-lane port configuration. The de-skew module (400A-400D) align the received data.

In block B504, the aligned words are received by the smoothing FIFOs 252A-252D. In block B506, the state machine 416 determines if the smoothing FIFO have reached a programmable upper threshold value to prevent overrun conditions. The upper threshold value may be set using processor 224 and stored at a memory location.

If the upper threshold value has not been reached, then in block B508, the process determines if a lower threshold value has been reached. The lower threshold value may be set using processor 224 and stored at a memory location. If not, then the process moves to block B506. If yes, then in block B510, frame gaps are determined to insert Idles. Thereafter, idles are inserted in block B512 and lanes are rotated. For example, if a frame gap (i.e. where Idles can be inserted) permits 4 inserts starting from lane 0, then all four Idles, one for each lane, are inserted in the same clock as shown in FIG. 4I. If the frame gap starts at lane 1, then 3 Idles can be inserted in lanes 1-3 and the fourth Idle is inserted in lane 0 in the next clock. If the frame gap starts at lane 2, then Idles are inserted in lanes 2 and 3 in the same clock cycle and Idles are inserted in lane 0 and 1 in the next clock cycle. If the frame gap begins in lane 3, then 1 idle is inserted in lane 3 and then in a next clock cycle, one Idle in each lane 0, 1 and 2 are inserted.

Referring back to block B506, if the upper threshold value has been reached, then in block B514, the deletable entries are identified based on certain alignment markers. The entries are deleted in block B516, according to the state machine diagram of FIG. 4C and the lanes are rotated in block B518. An example of lane rotations and the deletions are shown in FIGS. 4D-4H. For example, if there are 4 deletable entries in all four lanes, then the entries after the deletable entries are read and the deletable entries are skipped.

If there are 3 deletable entries, then the next entry after the deletable entries from three lanes are read in a same clock cycle. The lanes are rotated by 3 and in a next clock cycle another entry is deleted. The lanes are then rotated by one. Similar process is used for two and one deletable entries in a clock cycle.

In one embodiment, data order is maintained regardless of port configuration. Same logic and circuits are used for multiple lanes, regardless of the protocols that are used for sending and receiving information.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the systems and techniques described above can be used in any network device including adapters and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed:

1. A machine implemented method for a network device, comprising:
   determining when a smoothing first-in first out (FIFO) memory coupled to a network link for receiving information has reached an upper threshold value to prevent an overrun condition at the smoothing FIFO;
   wherein the network device includes a plurality of base-ports, each base-port includes a plurality of sub-ports and each sub-port is coupled to a network link from among a plurality of network links; and
   wherein the smoothing FIFO is used to temporarily store information at a first clock rate and information is read from the smoothing FIFO at a second clock rate; and
   wherein for receiving and sending information to and from another device, in a first configuration one of the sub-ports is configured to operate as a first independent port coupled to one network link and in a second configuration more than one sub-port, each coupled to one network link, are configured to jointly operate as a second independent port;
   identifying deletable entries, when the upper threshold value is reached;
   deleting the deletable entries based on the first configuration and the second configuration;
   rotating network links for the second configuration, based on a number of deletable entries and which network link smoothing FIFO has a deletable entry;
   determining that a lower threshold value has been reached to prevent underrun condition at the smoothing FIFO, when the upper threshold value has not been reached;
   determining frame gaps to insert characters, when the lower threshold has been reached; and
   inserting information at frame gaps, wherein to maintain order, a character is inserted for each network link in the second configuration in one clock cycle and more than one clock cycle, depending on a number of characters and which network link smoothing FIFO is where a first character is inserted.

2. The network device of claim 1, wherein in the second configuration, a plurality of sub-ports are configured as a four lane independent port, having a first lane, a second lane, a third lane and a fourth lane, and at any given instance when there are four deletable characters, one for each lane, then the four deletable characters are all deleted within a same clock cycle without any lane rotation.

3. The method of claim 2, wherein depending on a number of deletable characters, in the second configuration lanes are rotated for deleting entries from each smoothing FIFO for maintaining an order in which information is received at the first lane, second lane, third lane and the fourth lane.

4. The method of claim 2, wherein to maintain order in the second configuration, characters are inserted at the smoothing FIFO for each lane in one clock cycle or more than one clock cycle depending on a number of characters and which among the first lane, the second lane, the third lane and the fourth lane is where a first character is inserted.

5. The method of claim 2, wherein to maintain order in the second configuration, characters are deleted at the smoothing FIFO for each lane in one clock cycle or more than one clock cycle depending on a number of deletable characters and which among the first lane, the second lane, the third lane and the fourth lane is where a first character is deleted from.

6. The method of claim 1, wherein one of the sub-ports is configured to operate as a Fibre Channel port.

7. The method of claim 1, wherein one of the sub-ports is configured to operate as a Fibre Channel over Ethernet port.

8. A network device, comprising:
   a plurality of base-ports, each base-port includes a plurality of sub-ports and each sub-port is coupled to a network link from among a plurality of network links; wherein for receiving and sending information to and from another device, in a first configuration one of the sub-ports is configured to operate as a first independent port coupled to one network link and in a second configuration more than one sub-port, each coupled to one network link, are configured to jointly operate as a second independent port;
   a smoothing first-in first out (FIFO) memory coupled to the network link is used to temporarily store information at a first clock rate and information is read from the smoothing FIFO at a second clock rate; wherein an upper threshold value is used to prevent an overrun condition at the smoothing FIFO and a lower threshold value is used to prevent underrun condition at the smoothing FIFO; and
   a controller for each base-port for identifying deletable entries, when the upper threshold value is reached;
   deleting the deletable entries based on the first configuration and the second configuration;
   rotating network links for the second configuration, based on a number of deletable entries and which network link smoothing FIFO has a deletable entry;
   determining that the lower threshold value has been reached to prevent underrun condition at the smoothing FIFO, when the upper threshold value has not been reached;
   determining frame gaps to insert characters, when the lower threshold has been reached;
   and inserting information at frame gaps, wherein to maintain order, a character is inserted for each network link in the second configuration in one clock cycle and more than one clock cycle, depending on a number of characters and which network link smoothing FIFO is where a first character is inserted.

9. The network device of claim 8, wherein in the second configuration, a plurality of sub-ports are configured as a four lane independent port, having a first lane, a second lane, a third lane and a fourth lane, and at any given instance when there are four deletable characters, one for each lane, then the four deletable characters are all deleted within a same clock cycle without any lane rotation.

10. The network device of claim 9, wherein depending on a number of deletable characters, in the second configuration lanes are rotated for deleting entries from each smoothing FIFO for maintaining an order in which information is received at the first lane, second lane, third lane and the fourth lane.

11. The network device of claim 9, wherein to maintain order in the second configuration, characters are inserted at the smoothing FIFO for each lane in one clock cycle or more than one clock cycle depending on a number of characters and which among the first lane, the second lane, the third lane and the fourth lane is where a first character is inserted.

12. The network device of claim 9, wherein to maintain order in the second configuration, characters are deleted at the smoothing FIFO for each lane in one clock cycle or more than one clock cycle depending on a number of deletable characters and which among the first lane, the second lane, the third lane and the fourth lane is where a first character is deleted from.

13. The network device of claim 8, wherein one of the sub-ports is configured to operate as a Fibre Channel port.

14. The network device of claim 8, wherein one of the sub-ports is configured to operate as a Fibre Channel over Ethernet port.

15. A non-transitory, machine readable medium having stored thereon instructions comprising machine executable code which when executed by a machine, causes the machine to:
determine when a smoothing first-in first out (FIFO) memory coupled to a network link for receiving information has reached an upper threshold value to prevent an overrun condition at the smoothing FIFO; wherein the network device includes a plurality of base-ports, each base-port includes a plurality of sub-ports and each sub-port is coupled to a network link from among a plurality of network links; and
wherein the smoothing FIFO is used to temporarily store information at a first clock rate and information is read from the smoothing FIFO at a second clock rate; and wherein for receiving and sending information to and from another device, in a first configuration one of the sub-ports is configured to operate as a first independent port coupled to one network link and in a second configuration more than one sub-port, each coupled to one network link, are configured to jointly operate as a second independent port;
identify deletable entries, when the upper threshold value is reached;
delete the deletable entries based on the first configuration and the second configuration;
rotate network links for the second configuration, based on a number of deletable entries and which network link smoothing FIFO has a deletable entry;
determine that a lower threshold value has been reached to prevent underrun condition at the smoothing FIFO, when the upper threshold value has not been reached;
determine frame gaps to insert characters, when the lower threshold has been reached; and
insert information at frame gaps, wherein to maintain order, a character is inserted for each network link in the second configuration in one clock cycle and more than one clock cycle, depending on a number of characters and which network link smoothing FIFO is where a first character is inserted.

16. The non-transitory, storage medium of claim 15, wherein in the second configuration, a plurality of sub-ports are configured as a four lane independent port, having a first lane, a second lane, a third lane and a fourth lane, and at any given instance when there are four deletable characters, one for each lane, then the four deletable characters are all deleted within a same clock cycle without any lane rotation.

17. The non-transitory, storage medium of claim 16, wherein depending on a number of deletable characters, in the second configuration lanes are rotated for deleting entries from each smoothing FIFO for maintaining an order in which information is received at the first lane, second lane, third lane and the fourth lane.

18. The non-transitory, storage medium of claim 16, wherein to maintain order in the second configuration, characters are inserted at the smoothing FIFO for each lane in one clock cycle or more than one clock cycle depending on a number of characters and which among the first lane, the second lane, the third lane and the fourth lane is where a first character is inserted.

19. The non-transitory, storage medium of claim 16, wherein to maintain order in the second configuration, characters are deleted at the smoothing FIFO for each lane in one clock cycle or more than one clock cycle depending on a number of deletable characters and which among the first lane, the second lane, the third lane and the fourth lane is where a first character is deleted from.

20. The non-transitory, storage medium of claim 15, wherein one of the sub-ports is configured to operate as a Fibre Channel port.

21. The non-transitory, storage medium of claim 15, wherein one of the sub-ports is configured to operate as a Fibre Channel over Ethernet port.

* * * * *